United States Patent [19]

Nishitani et al.

[11] Patent Number: 5,589,715
[45] Date of Patent: Dec. 31, 1996

[54] METER MODULE ASSEMBLY

[75] Inventors: Keizo Nishitani, Susono; Hiroshi Suzuki, Haibara-gun, both of Japan

[73] Assignee: Yazaki Corporation, Tokyo, Japan

[21] Appl. No.: 411,304

[22] Filed: Mar. 27, 1995

[30] Foreign Application Priority Data

Mar. 28, 1994 [JP] Japan ................................ 6-057071

[51] Int. Cl.$^6$ .............................. H02B 1/26; H02G 3/00
[52] U.S. Cl. ......................... 307/10.1; 361/647; 439/34
[58] Field of Search ..................................... 307/9.1, 10.1;
340/458; 439/34, 620; 361/646, 647, 641,
785, 600, 601, 622, 624, 628, 643, 644,
448, 720, 736, 752, 775, 784

[56] References Cited

U.S. PATENT DOCUMENTS 5,255,155 10/1993 Sugimoto et al. ...................... 361/752

5,353,190 10/1994 Nakayama et al. ..................... 307/10.1

FOREIGN PATENT DOCUMENTS 57-38457  8/1982  Japan.

Primary Examiner—William M. Shoop, Jr.
Assistant Examiner—Richard T. Elms
Attorney, Agent, or Firm—Armstrong, Westerman, Hattori, McLeland & Naughton

[57] ABSTRACT

A meter module assembly includes a junction box for distributing input/output signals and electric power to on-vehicle electrical components, a switch unit having a plurality of switches for controlling the electrical components, and an instrument board. A panel mounting case has an upper case and a lower case. The upper case houses the instrument board therein. The switch unit and junction box are combined by means of a flexible printed circuit board to form a control board. The upper case and lower case is assembled together with the control board sandwiched between the upper and lower cases so that the instrument board is electrically connected with the control board.

6 Claims, 13 Drawing Sheets

METER MODULE ASSEMBLY

FIELD OF THE INVENTION

The present invention relates to a meter module assembly which facilitates the wiring and assembly of electric equipment to the instrument panel of an automobile.

PRIOR ART

A number of electrical apparatuses are arranged in the instrument panel and therearound of an automotive vehicle. Thus, a large number of meters, control circuit units, indicator lamps, and switches used for controllably monitoring such electrical apparatuses, are mounted in a rather small area. This indicates that a large number of wires are inherently involved in the instrument wire harness, resulting in a fat, heavy, and complex wire harness. Such a wire harness requires more labor and time when mounting the harness in the automobile as well as when performing maintenance and regular check-up.

In order to simplify the design of wire harness and maintain the slim shape of wire harness, Japanese Patent Publication No. 57-38457 has proposed to arrange a plurality of junction boxes disposed in appropriate areas of the vehicle. The junction box houses branches of wire harnesses and a large number of circuit-protecting components such as fuses and control components such as relays.

FIG. 11 is a schematic diagram of a wiring schedule for tail lamps based on such a junction box. Tail lamps 25A and 25B, clearance lamps 26A and 26B and engine 29 are mounted on the vehicle body. A battery, not shown, is provided in an engine room 29A. Provided in the vicinity of an instrument panel 30 are a tail relay 27 and a junction box 33 including a main fuse 28A, fuse 28B for tail-lamps, fuse 28C for meters, and relay 34 for detecting lamp burn-out. There is also provided in the vicinity of the instrument panel 30 a tail switch 35 an instrument board 32 having an alarm lamp 31 for tail lamps.

Turning on the tail switch 35 causes the tail relay 27 to close contacts thereof, allowing to energize the circuit having the tail lamp fuse 28B so that lamps 25A, 25B, 26A and 26B light up. When either the lamp 25A or 25B burns out, the lamp burn-out detecting relay 34 operates to cause the alarm lamp 31 of the meter panel 32 to light up.

FIG. 12 is a schematic block diagram in the proximity to a combination meter 32 to which junction box 33, lamp burn-out relay 34, and control circuit units 50 including a speed-controlling relay and integration relays are, connected.

Provided within the meter panel are a number of meters 36 including mounted an oil meter, battery meter, speedometer, tachometer, movements 37 for the meters 36, and lamps 31 for indicators, alarms, and illumination purposes. The speedometer 36A and tachometer 36B are provided with exclusive control circuits 38A and 38B, respectively. The controlling circuit units for the speed-controlling relays and integration relays are arranged in a decentralized manner, necessitating a very large number of power lines and signal lines that connect between these relays. Arranging a few junction boxes 33 in limited areas will not solve the complexity of wiring.

Japanese Patent Preliminary Publication No. 2-45238 has proposed to simplify wire harnesses connected to the instrument panel. In the publication, a branch circuit is provided in the instrument panel, which branch circuit has a joint connection for electrically connecting between the instrument panel and the wire harnesses so that the instrument panel serves as a branch which would otherwise be in the wire harness. This decreases the number of circuits to be housed in the junction boxes as well as wires to be connected within the junction box.

FIG. 13 shows a circuit configuration disclosed in Japanese Patent Preliminary Publication No. 2-266537. Switches and meters, not shown, are mounted on a cluster 40 of an instrument panel 39. A flexible printed circuit board (FPC) 41 on which an electrical circuit is formed for the switches and meters, is bonded to the back surface of the cluster 40. The FPC 41 has electronic control boards 43A–43F connected to various end portions thereof. Each of the electronic control boards has electronic components, for example, memories and operational components required for controlling the switches and meters, which arranged in a decentralized manner.

As far as the individual control circuit units are arranged in a decentralized manner, simplification of wire harness is quite limited even if part of the wire harnesses and/or branch circuits of junction boxes is incorporated within the instrument board. Therefore, the prior art cannot lend itself to more electronics to be incorporated in the future for comfort in the passenger space and safety of the vehicle. Arranging electrical circuits (flexible printed circuit boards) and electronic control boards for the respective switches and meters behind the cluster, is advantageous in that control circuit units are centrally located behind the cluster. However, the electrical circuits and electronic control boards must be configured to mate with the specific contour of the back side of the cluster, which is usually different for models and classes of vehicles. Therefore, the electrical circuits and electronic control boards are subject to changes in design and requirements according to the types and classes of vehicles. This leads to production of many types of meter module in small quantities, which usually requires high cost. Therefore, a specific production line is required for a specific design of electrical circuit and electronic control board sacrificing production efficiency.

SUMMARY OF THE INVENTION

An object of the invention is to provide a meter module assembly which is adapted to mount additional electrical components and to address different models and grades of automotive vehicle. Another object of the invention is to provide a meter module where wiring associated with the instrument panel is extremely simplified to facilitate wiring and assembly in the vicinity of the instrument panel.

A meter module assembly includes a junction box for distributing input/output signals and electric power to on-vehicle electrical components, a switch unit having a plurality of switches for controlling the on-vehicle electrical components, and an instrument board. A panel mounting case has an upper case and a lower case. The upper case houses the instrument board therein. The function box and the switch unit are combined by means of a flexible printed circuit board to form a control board. The upper case and lower case is assembled together with the control board sandwiched between the upper and lower cases so that the instrument board is electrically connected with the control board.

BRIEF DESCRIPTION OF THE INVENTION

Features and other objects of the invention will become more apparent from the description of the preferred embodiment of with reference to the accompanying drawings in which.

DETAILED DESCRIPTION OF THE PREFERRED EMBODIMENTS

Operation

Figure 1:
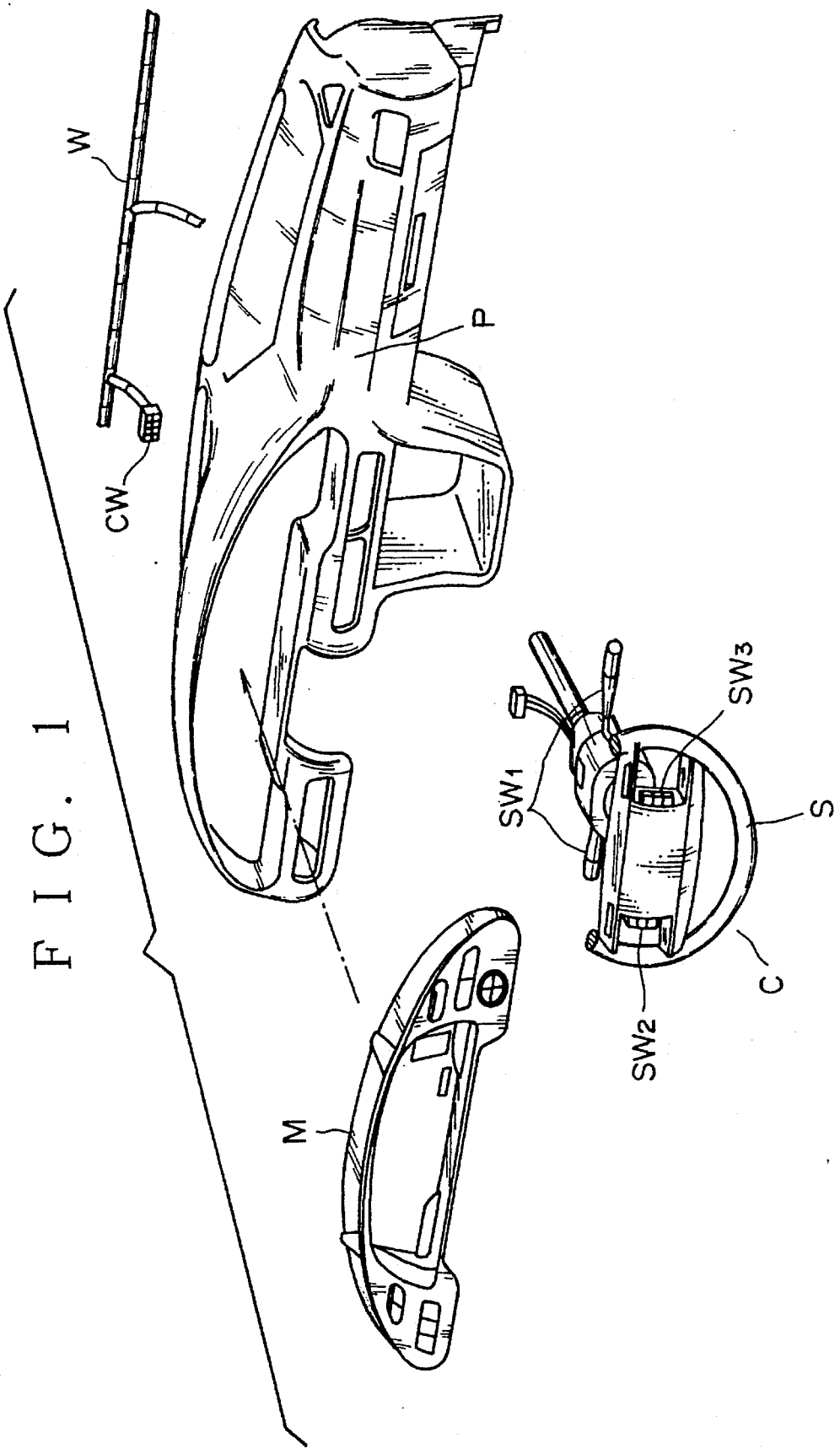
FIG. 1 is a perspective view showing a meter module assembly M according to the invention, detached from an instrument panel P.

A junction box 2 incorporates function circuits for controlling on-vehicle electrical components such as meters and indicator lamps. Switch units 3 and 3' incorporate switches used for the on-vehicle electrical components. The junction box 2 and the switch units 3 and 3' are integrally combined on a flexible printed circuit board to form a control board as a whole. The control board 4 is inserted into a space between the upper and lower cases 7 and 8 of the panel mounting case 5 so that the meter module assembly is of integral construction. This construction reduces the number of connectors for interconnecting the circuits and achieves light weight and small size of the meter module. The construction not only improves reliability of the meter module but also simplifies the assembly operation of the meter module to the instrument board, wire harness, and instrument panel. The instrument board may be detached without difficulty facilitating operations for maintenance and regular check ups. The meter module assembly is adapted to mount additional electrical components and to address different models and grades of automotive vehicle.

Construction

Figure 2:
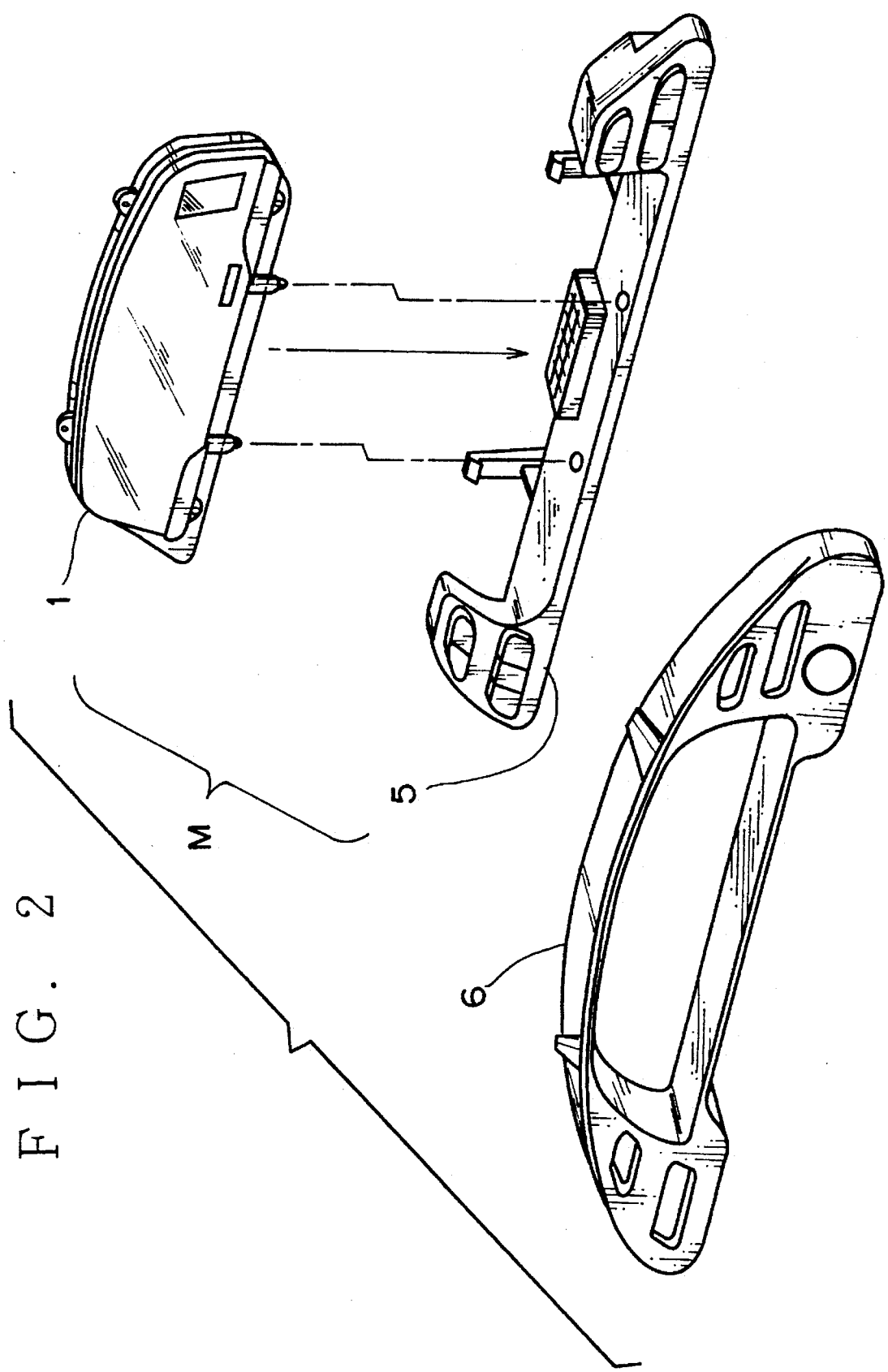
FIG. 2 is an exploded perspective view of the meter module assembly M.
Figure 3:
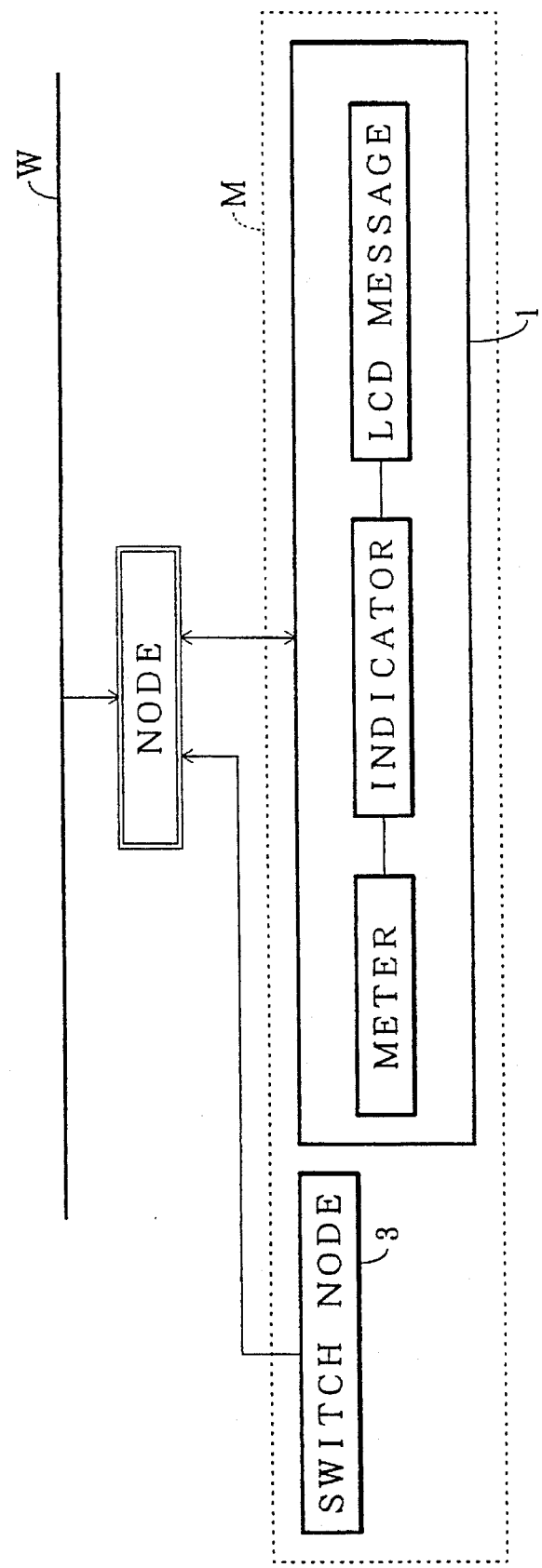
FIG. 3 is a system block diagram of the meter module M.

FIG. 1 is a perspective view showing a meter module assembly M according to the present invention, when detached from an instrument panel P. FIG. 2 is an exploded perspective view of the meter module assembly M and FIG. 3 is a system block diagram of the meter module M.

In the figures, the meter module assembly M and a steering S equipped with a column switch assembly C are assembled to the instrument panel P from the forward side of the panel P, and an instrument-panel harness W from the rearward side of the panel P. The column switch assembly C incorporates, for example, switches such as a horn switch SW2 and tilt/telesco switch SW3 in addition to multi-function switches SW1 provided on the left and right side of the column. The meter module assembly M, as shown in FIG. 2, includes an instrument board 1, which includes meters and indicator lamps and drive circuits therefor, and a panel-mounting case 5 that incorporates a later described control board 4. A finish panel 6 is mounted, if required, as a decorative panel to the instrument panel P to cover the forward surface of the panel mounting case 5.

Figure 4:
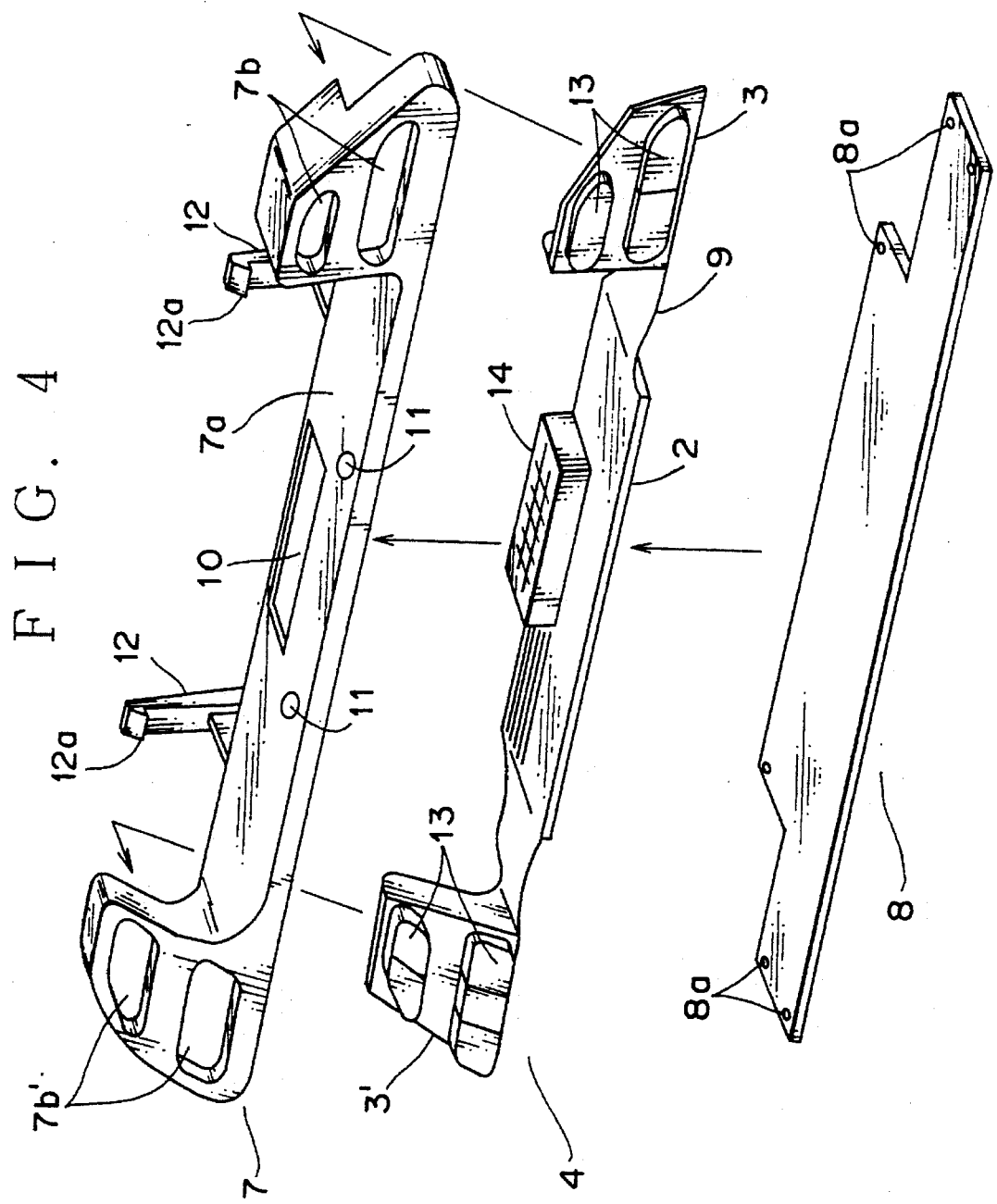
FIG. 4 is an exploded perspective view of a panel mounting case of FIG. 2, showing the upper case, the lower case, and the control board.

As shown in FIG. 4, the panel mounting case 5 includes an upper 7 and a lower case 8 between which a control board 4 is mounted. The control board 4 includes a pair of switch units 3 and 3' and a junction box 2 which are integrally constructed on a flexible circuit board (FPC) 9. The junction box 2 incorporates functional circuits for controlling and distributing electric power and input/output signals to on-vehicle electrical components such as the meters and indicator lamps. The switch units 3 and 3' incorporate switches for the aforementioned on-vehicle electrical components.

The upper case 7 in the form of a frame is molded of a synthetic resin. The upper case 7 includes a recess 7a in the middle thereof into which the instrument board 1 is mounted, and windows 7b and 7b' through which switches 13 project outwardly of the upper case 7 when control board 4 is mounted to the upper case. The switches 13 are used to operate the switch units 3 and 3' The upper case 7 is formed with a connector-inserting window 10 in the middle of the bottom thereof and guide holes 11 near the window 10. The upper case 7 has levers 12 which project upwardly from the rear of the upper case 7 and serve to lock the instrument board 1 to the upper case 7 when the instrument board 1 is assembled to the upper case.

The function box 2 supports the FPC 9 thereon on which a connector 14 is placed with the fitting portion thereof orienting upward, so that the connector 14 projects into the upper case 7 through the window 10.

The function box 2 is mounted by hot melt technique in the middle of the FPC 9 on which a necessary circuit is formed by etching. The FPC 9 has longitudinal ends to which the switch units 3 and 3' are electrically connected.

The plate-like lower case 8 is formed with holes 8a in a peripheral portion thereof, so that the lower case 8 is assembled to the upper case 7 by means of screws inserted through the holes 8 to complete the panel mounting case 5 with the FPC 9 sandwiched between the upper and lower cases.

Figure 5:
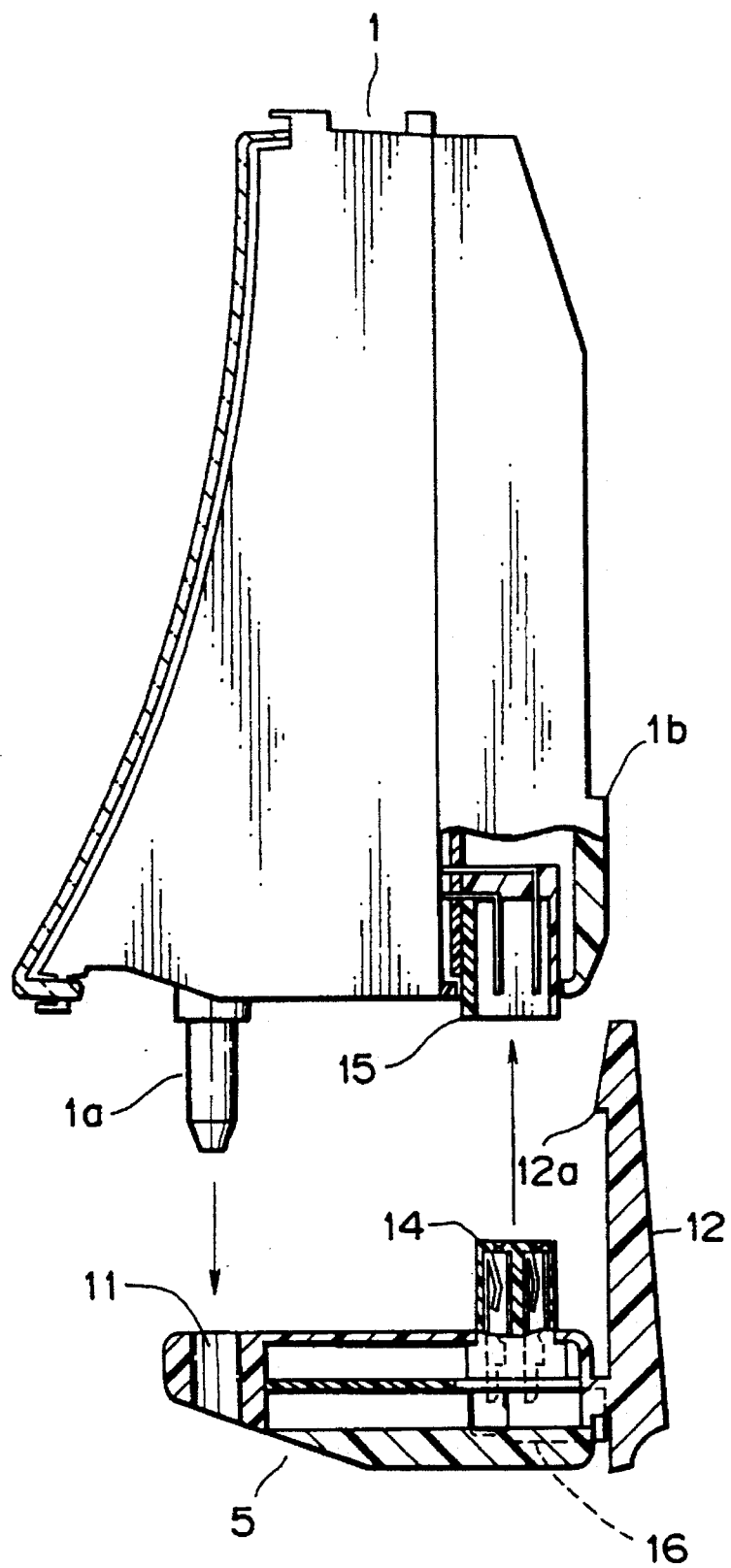
FIG. 5 is an illustrative diagram showing the panel mounting case of FIG. 4 being assembled to the instrument board.
Figure 6:
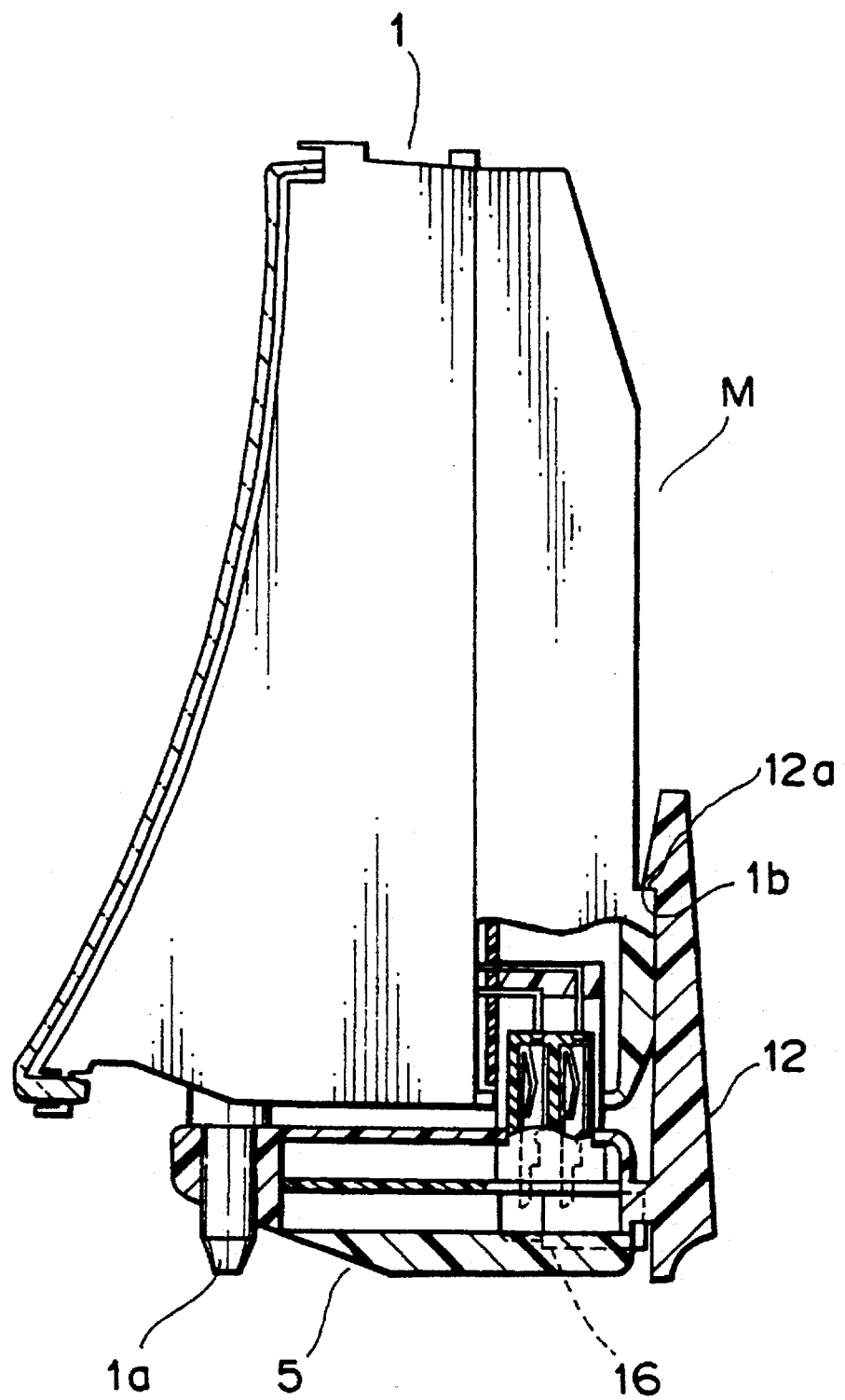
FIG. 6 is a longitudinal cross-sectional view showing the meter module assembly constructed by combining the panel mounting case and instrument board of FIG. 5.

FIGS. 5 and 6 are illustrative diagrams of the assembly stage where the panel mounting case 5 and the instrument board 1 are combined to form the meter module M. As shown by an arrow, knock pins 1a downwardly projecting from the bottom of the instrument board 1 fit into the guide holes 11 in the upper case 7 for mechanical connection. The connector 15 has a fitting portion thereof oriented downwardly and is fitted into the connector 14 on the FPC 9 for electrical connection as shown in FIG. 6. During the assembly operation, the tip end portion of the lever 12 overrides an engagement projection 1b on the back side of the instrument board 1, so that the locking click 12a engages an engagement projection 1b to lock the instrument 1 to the panel-mounting case 5, thus completing the meter module M. The finish panel 6 may be attached to the front of the panel-mounting case 5 for more attractive appearance.

A connector 16 is provided on the underside of the FPC 9 with a fitting portion of the connector 16 oriented downwardly. The connector 16 fits into the connector CW on the instrument-panel harness W to make electrical connection upon mounting the meter module M onto the instrument panel P.

The aforementioned meter module M has no connectors projecting from the rear side of the instrument board 1. Thus, this construction inherently prevents wires such as wire harnesses from being clustered on the rear of the instrument board 1, providing some space on the rear of the instrument board for other purpose.

Figure 7:
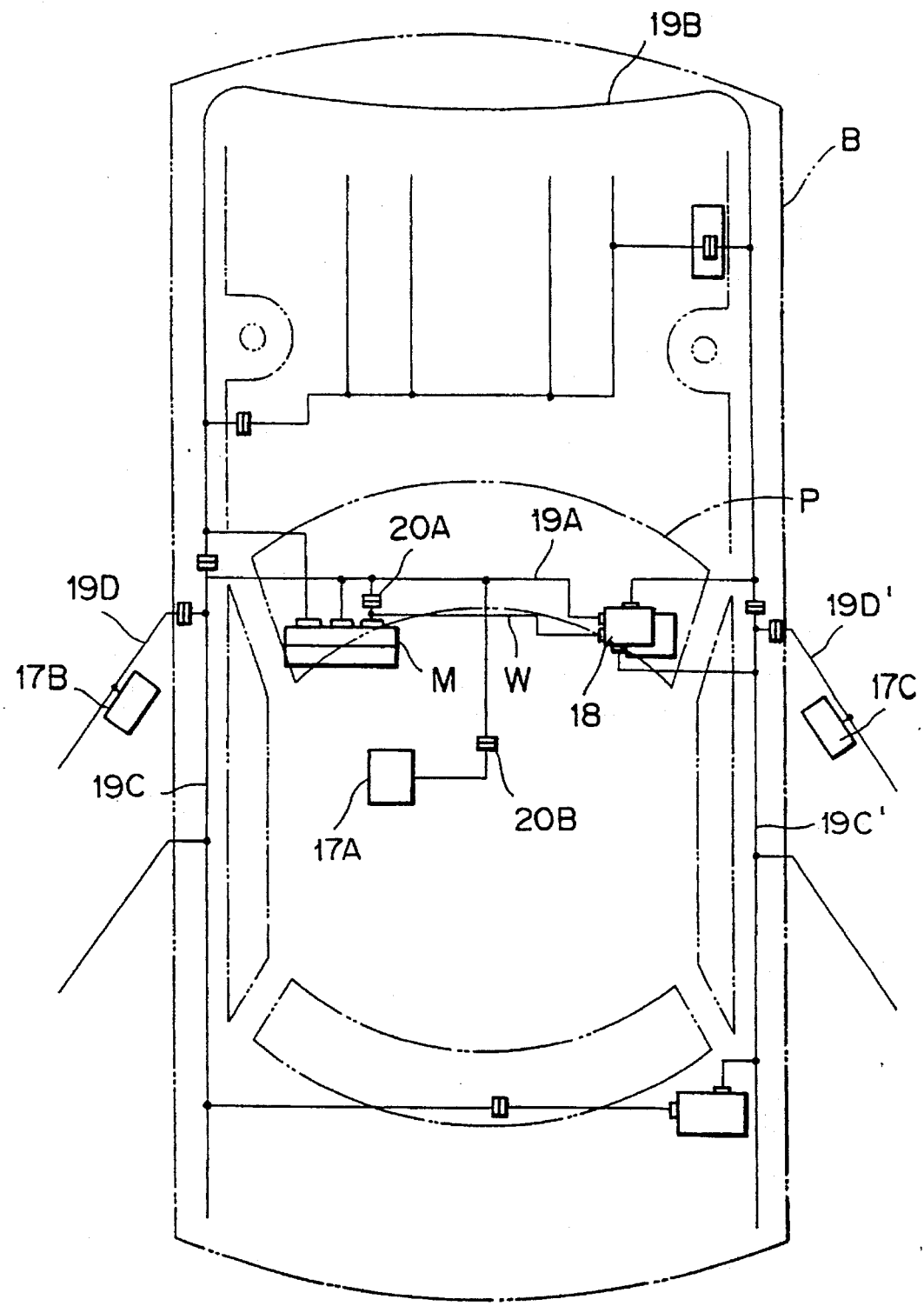
FIG. 7 is an illustrative diagram showing the layout of an on-vehicle wire harness based on the meter module of FIG. 2.

FIG. 7 illustrates a layout of a wire harness laid in an automotive vehicle which uses a meter module M of the present invention. In the figure, reference numerals 17A–17C denote circuit control units or junction boxes while numeral 18 represents a well known main junction box in which a number of fuses and relays are mounted.

The meter module M is arranged on the left half of the instrument panel P and the aforementioned main junction box 18 on the right half. A seat module 17A for controlling various optional electrical components is disposed between the meter module M and the main junction box 18. A door module 17B is disposed on the left door (driver side) and a door module 17C is disposed on the right door. Reference numeral 19A denotes a cowl side wire harness, 19B a main wire harness in the engine room, 19C and 19C' wire harnesses for the floor, 19D and 19D' wire harnesses for the doors, and 20A and 20B male-female connections.

Figure 8:
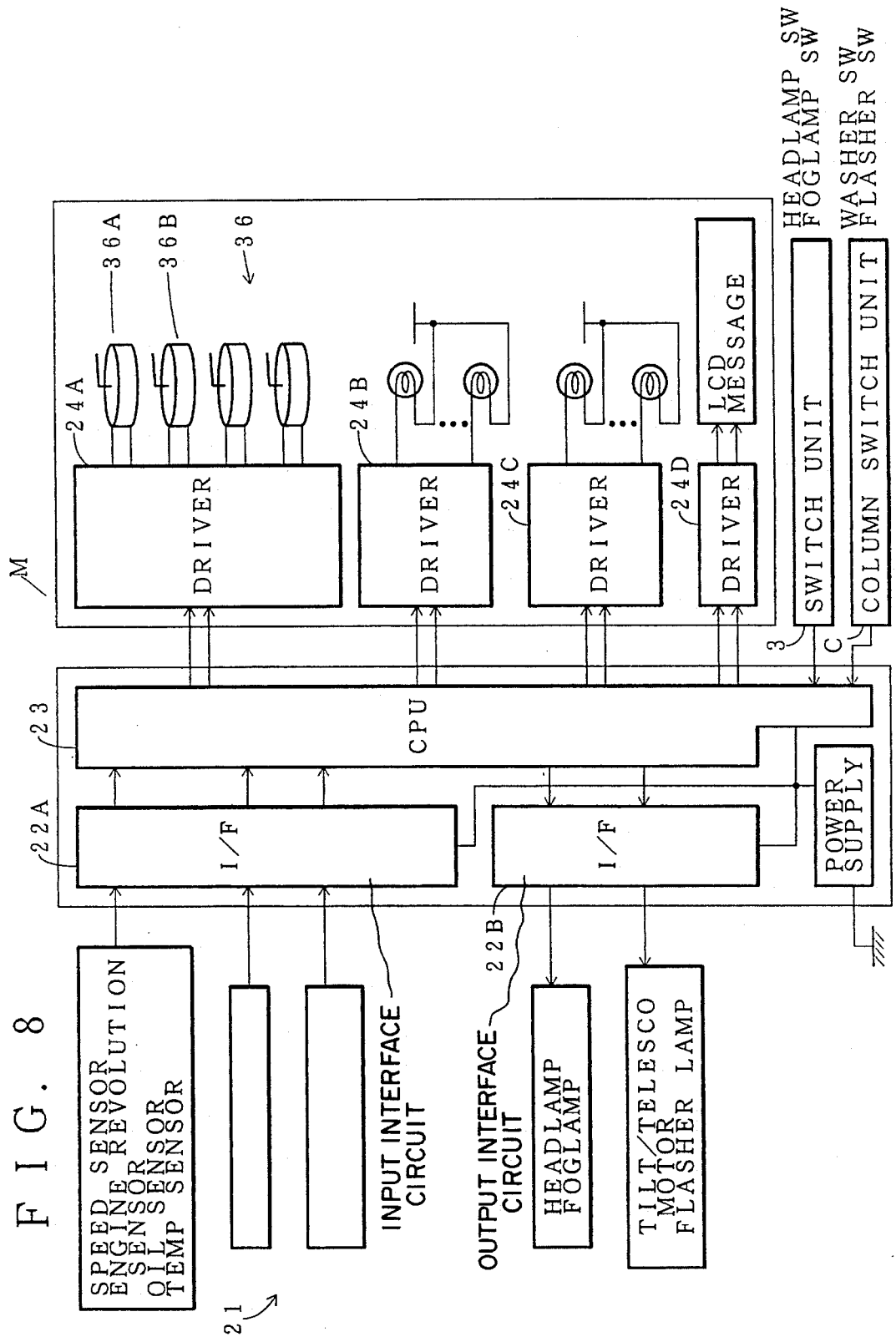
FIG. 8 is a schematic block diagram of the meter module of FIG. 2.

FIG. 8 shows various signal generating means 21, input interface (I/F) circuit 22A, output interface (I/F) Circuit 22B, CPU 23, and various drive circuits 24A–24D.

Figure 9:
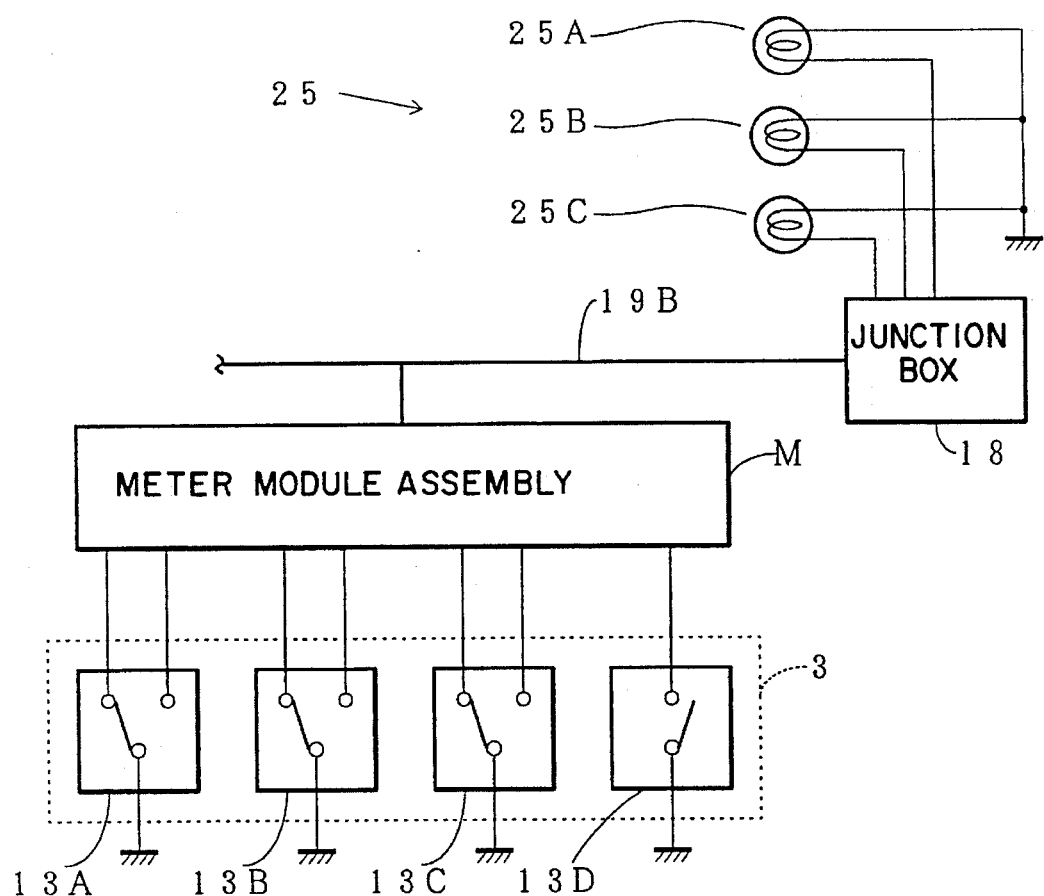
FIG. 9 is a schematic diagram of the switch circuits of FIG. 8.

The junction box 2 is of integral construction incorporating functional circuits (signal converter for multiplexing), and the various switches 13A–13D are of integral construction as the switch unit 3. The switch unit 3' is also of similar construction to that of the switch unit 3. Thus, the switches 13A–13D are directly connected to the CPU 23, requiring no sub harnesses. In FIG. 9, references 25A–25C denote various lamps such as head lamp and fog lamp.

Figure 10:
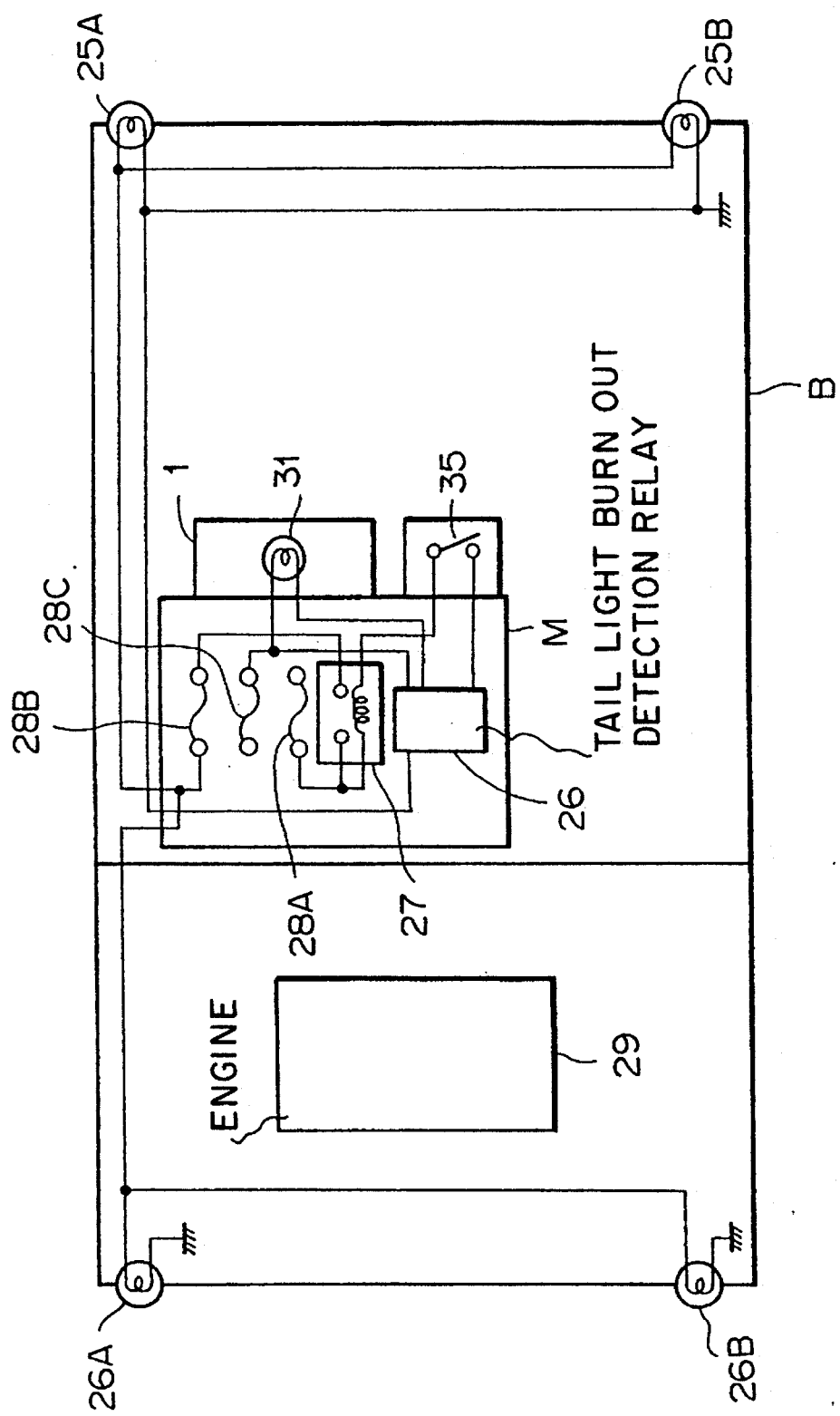
FIG. 10 is a schematic diagram showing an example of on-vehicle wiring based on the meter module assembly of FIG. 2.
Figure 11:
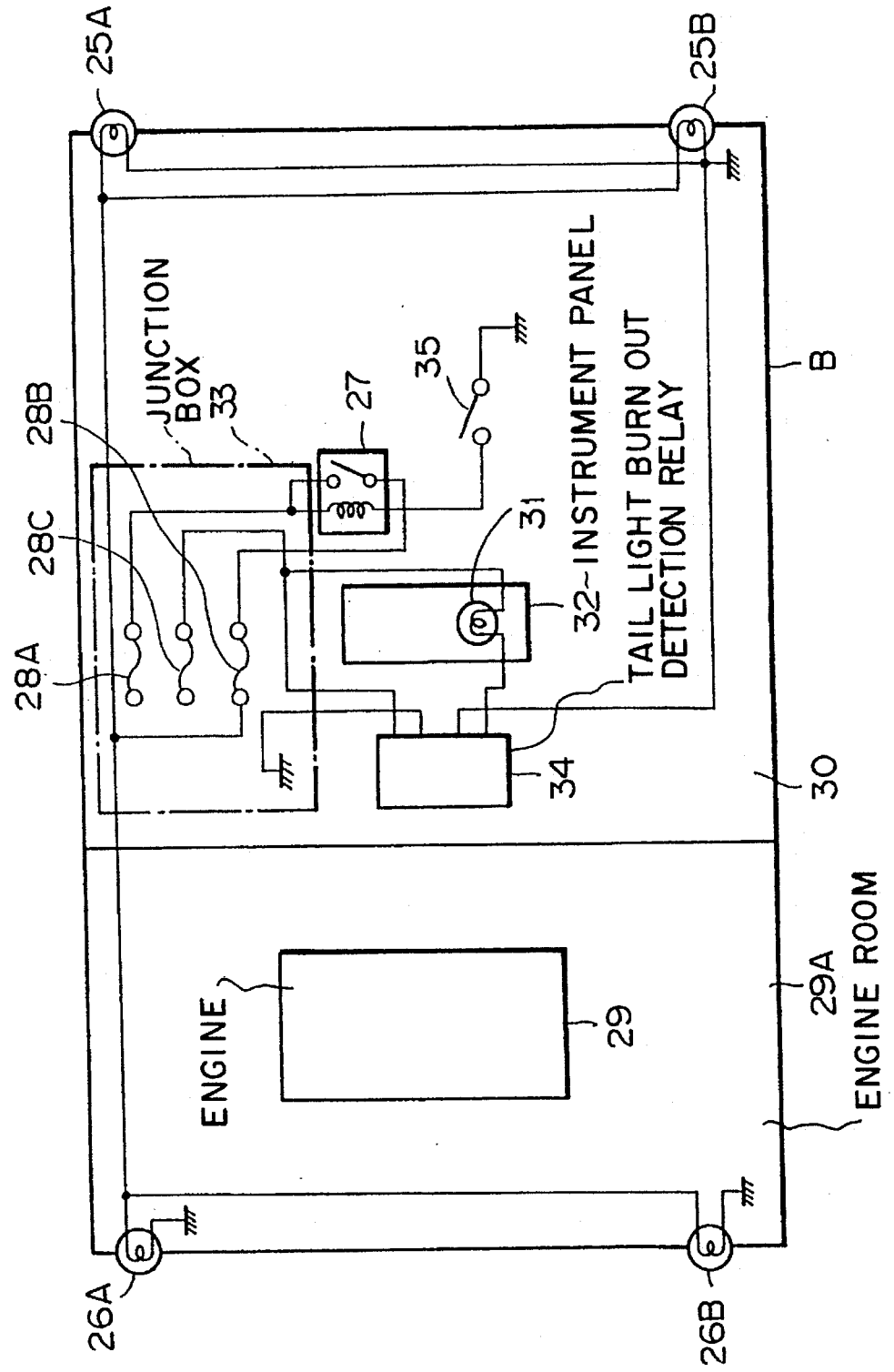
FIG. 11 is a prior art wiring schedule corresponding to that of FIG. 10.
Figure 12:
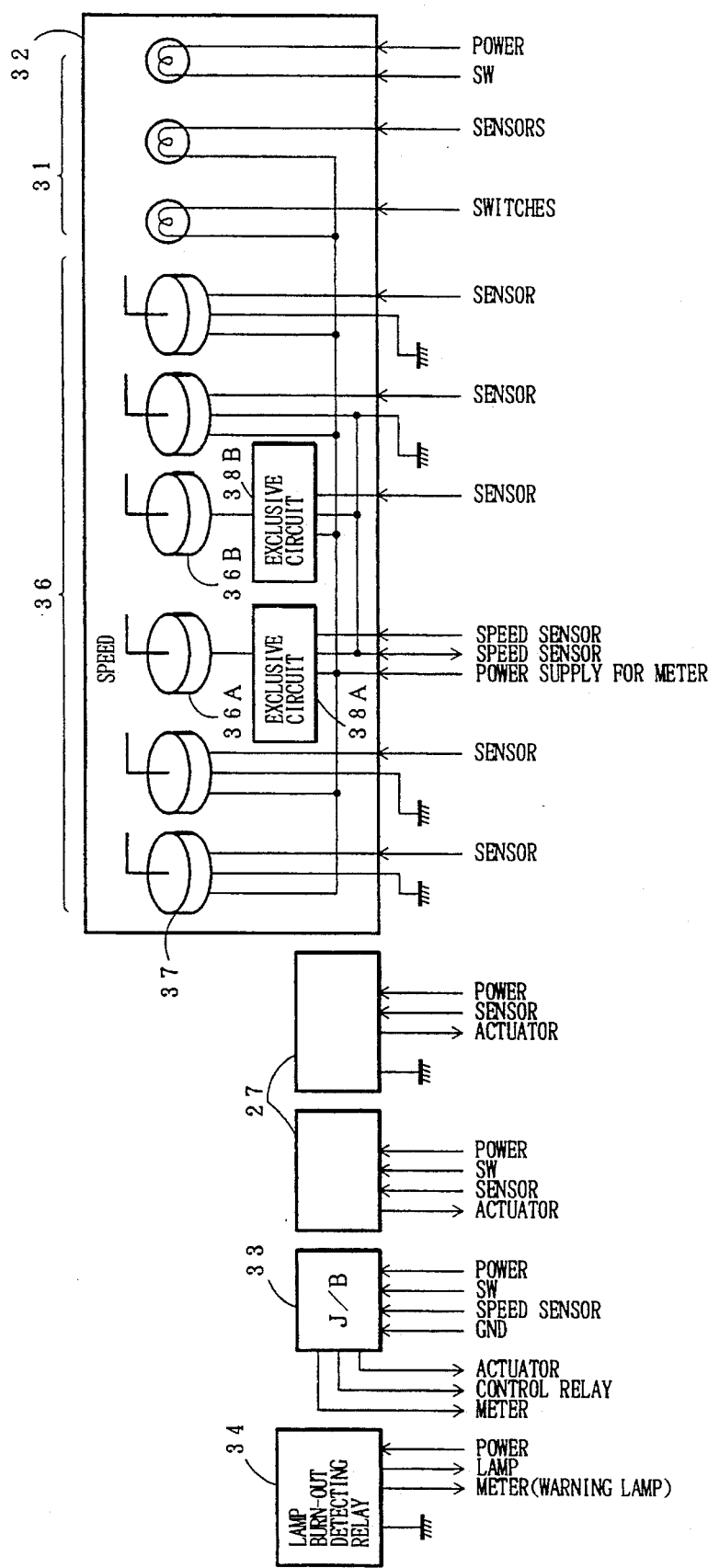
FIG. 12 is a schematic block diagram of prior art combination, relay, and junction box.
Figure 13:
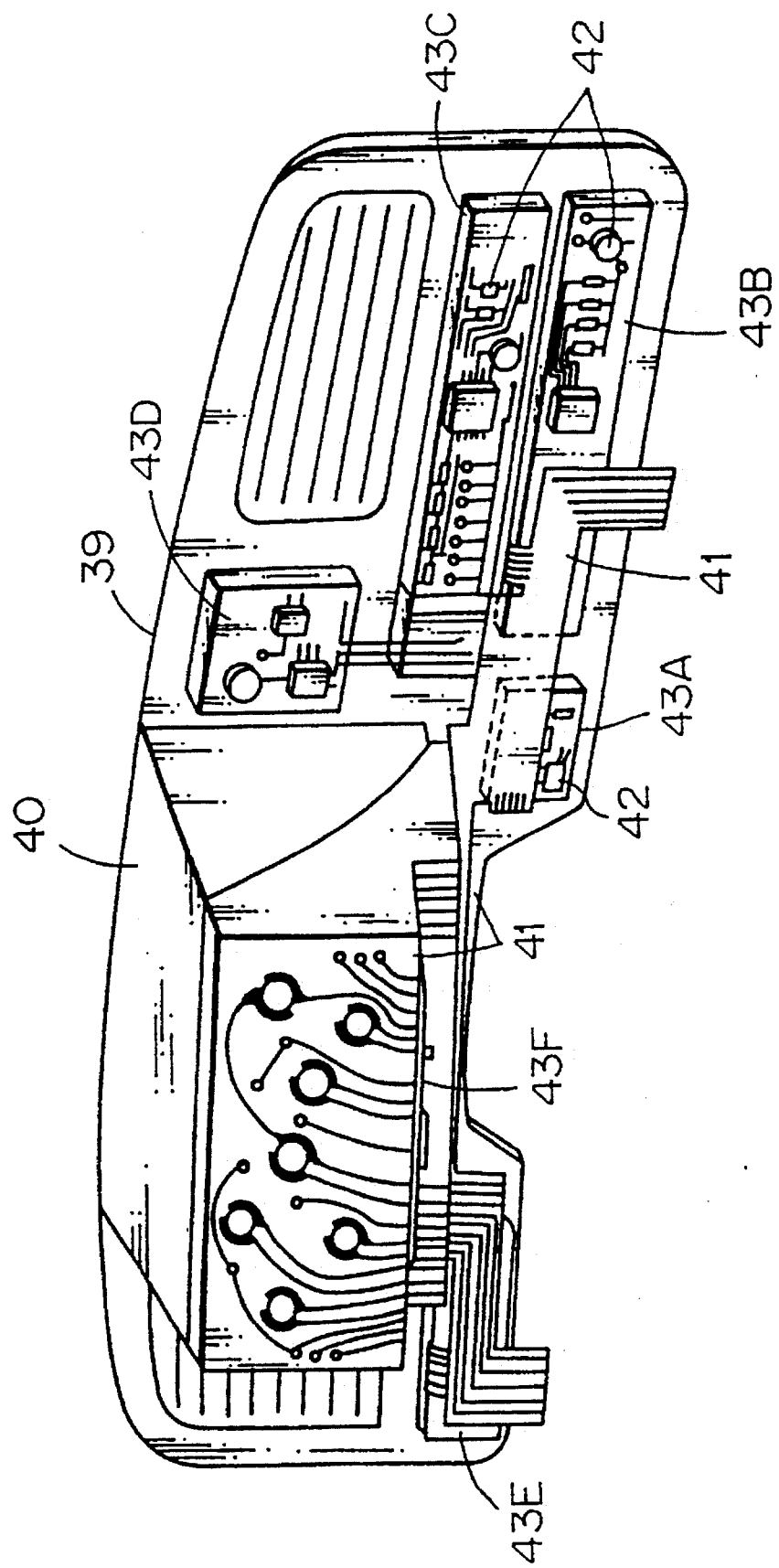
FIG. 13 illustrates configuration of an electrical circuit of a prior art instrument panel.

FIG. 10 is a wiring schematic diagram of tail lamps based on a meter module assembly M of the invention. In contrast to the wiring schedule of a prior art tail lamp shown in FIG. 11, the single meter module M incorporates a tail relay 27, fuses 28A–28C, and a relay 26 for detecting burn-out of lamps, thereby effectively reducing the number of wires.

What is claimed is:

1. A meter module assembly having at least one junction box for distributing input/output signals and electric power to on-vehicle electrical components, at least one switch unit having a plurality of switches for controlling said electrical components, and an instrument board, comprising:

a circuit board by means of which said junction box and said switch unit are electrically connected to form a control board, said junction box and said switch unit being horizontally juxtaposed in a direction perpendicular to a longitudinal axis of a vehicle with which said meter module assembly is use; and a panel-mounting case having a first case and a second case, said first case having said instrument board mounted upright thereon in vertical and crosswise arrangement relative to said longitudinal axis of the vehicle, said first case and second case being vertically assembled together in integral construction with said control board sandwiched between said first and second cases, said first case being provided with a hole through which said instrument board is electrically connected with said control board when said instrument board and said first and second cases are assembled together.

2. The meter module assembly according to claim 1, wherein said instrument board is provided with a first connector and engagement projections;

said first case is formed with a recess thereon for receiving said instrument board, and locking arms thereon for engaging said engagement projections;

said control board is provided with a second connector which fits through said hole into said first connector for electrical connection when said control board is assembled between said first and second cases, said control board is also provided with a third connector to be connected to an instrument-panel harness for connection with external circuits.

3. The meter module assembly according to any one of claims 1 and 2, wherein two said switch units are respectively provided on each of two opposed longitudinal ends of said circuit board, and said recess is provided in a middle portion of said first case.

4. The meter module assembly according to any one of claims 1 and 2, wherein said circuit board is a flexible printed circuit board.

5. The meter module assembly according to any one of claims 1 and 2, wherein a finish panel is mounted to a forward surface of said panel mounting case.

6. The meter module assembly according to claim 2, wherein said instrument board is further provided with a knock pin which engages in a corresponding guide hole in said first case for positioning said instrument board when said instrument board is mounted on said first case.

* * * * *